United States Patent
Zhou

(10) Patent No.: US 12,103,019 B1
(45) Date of Patent: Oct. 1, 2024

(54) WATER FILTER DEVICE AND SPRAY HEAD HAVING THE SAME

(71) Applicant: Guangdong SunRise Industrial Co., Ltd., Guangdong (CN)

(72) Inventor: Wei Zhou, Guangdong (CN)

(73) Assignee: Guangdong SunRise Industrial Co., Ltd., Dongguan (CN)

( * ) Notice: Subject to any disclaimer, the term of this patent is extended or adjusted under 35 U.S.C. 154(b) by 0 days.

(21) Appl. No.: 18/223,008

(22) Filed: Jul. 17, 2023

(51) Int. Cl.
| | |
|---|---|
| *B01D 29/13* | (2006.01) |
| *B01D 35/04* | (2006.01) |
| *B05B 1/18* | (2006.01) |
| *C02F 1/00* | (2023.01) |
| *B05B 15/40* | (2018.01) |

(52) U.S. Cl.
CPC .............. *B05B 1/185* (2013.01); *B01D 29/13* (2013.01); *B01D 35/04* (2013.01); *C02F 1/003* (2013.01); *B05B 15/40* (2018.02); *C02F 2307/06* (2013.01)

(58) Field of Classification Search
CPC ......... B01D 29/13; B01D 35/04; C02F 1/003; C02F 2307/06; B05B 1/185; B05B 1/18; B05B 15/40
USPC .......................................................... 210/449
See application file for complete search history.

(56) References Cited

U.S. PATENT DOCUMENTS

| | | | | |
|---|---|---|---|---|
| 2004/0255377 | A1* | 12/2004 | Mueller | B05B 15/40 4/615 |
| 2012/0055888 | A1* | 3/2012 | Hunter | A47K 3/286 210/767 |

* cited by examiner

*Primary Examiner* — Akash K Varma

(57) ABSTRACT

A water filter device and a spray head using the same are disclosed in present invention. The water filter device includes a case, a detachable portion easily disassembled and reassembled from the case for forming an accommodation space with the case, a filter cartridge received in the accommodation space for forming a redirected passage together with the detachable portion and the case. The filter cartridge includes a top portion, a bottom opposite to the top portion, and a sidewall connected with the top portion and the bottom. The case further includes a lateral and an outlet port formed on the lateral and is fluidly coupled to the redirected passage. When replacing the filter cartridge, there is no need to remove the entire spray head, just directly remove the detachable portion from the case.

13 Claims, 18 Drawing Sheets

WATER FILTER DEVICE AND SPRAY HEAD HAVING THE SAME

TECHNICAL FIELD

The present invention relates to a water filter device and a spray head having the same, and in particular, to an improved, a water filter device which is easily disassembled and reassembled for replacing or renewing a water filter cartridge carried therein.

BACKGROUND

In general, a typically long cylindrical water filter device with a filter cartridge is in fluid connection with a spray head and a shower arm or waterpipe in a bathroom or in a kitchen and is configured to cleanly filter out harmful substances such as rust or foreign substances mixed in the shower arm or waterpipe. Accordingly, when a filter cartridge is contaminated by harmful substances in the shower arm or waterpipe due to long-term use of the spray head, the filter cartridge of the water filter device may be replaced with a new one.

The water filter device secured between an outlet end of the waterpipe and the spray head is generally the type of one-piece and the entire periphery of the water filter device is directly assembled with the spray head. When replacing the filter cartridge, the spray head must be disassembled first. It is too difficult to disassembled and reassembled for replacing or renewing a water filter cartridge carried therein.

Therefore, it is necessary to provide a new water filter device to solve the above problems.

SUMMARY OF THE PRESENT INVENTION

In one aspect, the present disclosure provides a water filter device for preparing filtered water and comprising a case comprising an inlet port, a detachable portion disassembled and reassembled from the case for forming an accommodation space with the case, a filter cartridge received in the accommodation space for forming a redirected passage together with the detachable portion and the case, the filter cartridge comprising a top portion, a bottom opposite to the top portion, and a sidewall connected with the top portion and the bottom. Wherein the case further comprises a lateral and an outlet port formed on the lateral, the outlet port is fluidly coupled to the redirected passage.

Further, wherein the outlet port is located below the bottom of the filter cartridge, the redirected passage is formed by the bottom of the filter cartridge and the inner surface of the detachable portion.

Further, wherein the outlet port faces the sidewall of the filter cartridge, the redirected passage comprises a bottom passage located below the bottom of the filter cartridge and a side passage formed by the lateral of the case and the sidewall of the filter cartridge and fluidly coupled to the bottom passage.

Further, wherein the outlet port provides above the top portion of the filter cartridge, the redirected passage comprises a bottom passage located below the bottom of the filter cartridge and a side passage located between the lateral and sidewall of the filter cartridge and fluidly connected with the bottom passage.

Further, wherein the case further comprises a separating wall received in the accommodation space for fixing the filter cartridge.

Further, wherein the detachable portion comprises a second portion opposite to the bottom of the filter cartridge and directly abutting against the lateral.

Further, wherein in usage state, the filtered water flows out from the filter cartridge through the sidewall and/or the bottom thereof and then enters into the redirected passage.

In another aspect, the present disclosure provides a water filter device for preparing filtered water and comprising a case comprising an inlet port and a lateral, a detachable portion disassembled and reassembled from the case for forming an accommodation space with the case, the detachable portion comprising a second portion and a side portion extending from the second portion for abutting against the lateral of the case, a filter cartridge received in the accommodation space for forming a redirected passage together with the detachable portion, the filter cartridge comprising a top portion, a bottom opposite to the top portion, and a sidewall connected with the top portion and the bottom. Wherein the detachable portion further comprises an outlet port formed on the side portion, the outlet port is fluidly coupled to the redirected passage.

Further, wherein the outlet port is located below the bottom of the filter cartridge, the redirected passage is formed by the bottom of the filter cartridge together with the second portion and the side portion of the detachable portion.

Further, wherein the outlet port faces the sidewall of the filter cartridge, the redirected passage comprises a bottom passage located below the bottom of the filter cartridge and a side passage formed by the side portion of the detachable portion together with the sidewall of the filter cartridge and fluidly coupled to the bottom passage.

Further, wherein the outlet port provides above the top portion of the filter cartridge, the redirected passage comprises a bottom passage located below the bottom of the filter cartridge and a side passage formed by the side portion of the detachable portion together with the sidewall of the filter cartridge and fluidly coupled to the bottom passage.

Further, wherein the case further comprises a separating wall received in the accommodation space for fixing the filter cartridge.

Further, wherein in usage state, the filtered water flows out from the filter cartridge through the sidewall and/or the bottom thereof and then enters into the redirected passage.

In the other aspect, the present disclosure provides a water filter device for preparing filtered water and comprising a case comprising an inlet port and a lateral, a detachable portion disassembled and reassembled from the case for forming an accommodation space with the case, the detachable portion comprising a second portion and a side portion extending from the second portion for abutting against the lateral of the case, a filter cartridge received in the accommodation space for forming a redirected passage together with the detachable portion, the filter cartridge comprising a top portion, a bottom opposite to the top portion, and a sidewall connected with the top portion and the bottom. Wherein the detachable portion further comprises an outlet port formed on the side portion, the outlet port is fluidly coupled to the redirected passage.

Further, wherein the spray portion comprises an inner part connected with the case and the detachable portion for forming a receiving chamber fluidly coupling to the outlet port, the inner part comprises a baffle, a receiving opening provided on the middle of the baffle for receiving the detachable portion, a fastening wall projected from the baffle and surrounding the receiving opening for engaging with the detachable portion.

Further, wherein the detachable portion includes a second portion and a side portion extending from the second portion for abutting against the fastening wall of the spray portion.

Further, wherein the side portion comprises a first fixing wall inserted into the receiving opening and abutting against the fastening wall of the spray portion, a second fixing wall extending from the first fixing wall and connected to the lateral of the case, the outlet port is provided on the second fixing wall.

Further, wherein the second fixing wall is sandwiched between the lateral of the case and the sidewall of the filter cartridge.

Further, wherein the outlet port is located below the bottom of the filter cartridge, the redirected passage is formed by the bottom of the filter cartridge together with the second portion and the side portion of the detachable portion.

Further, wherein in usage state, the filtered water flows out from the filter cartridge through the sidewall and/or the bottom thereof and then enters into the redirected passage.

When replacing the filter cartridge, there is no need to remove the entire spray head, just directly remove the detachable portion from the case.

DESCRIPTION OF EMBODIMENTS

Figure 1:
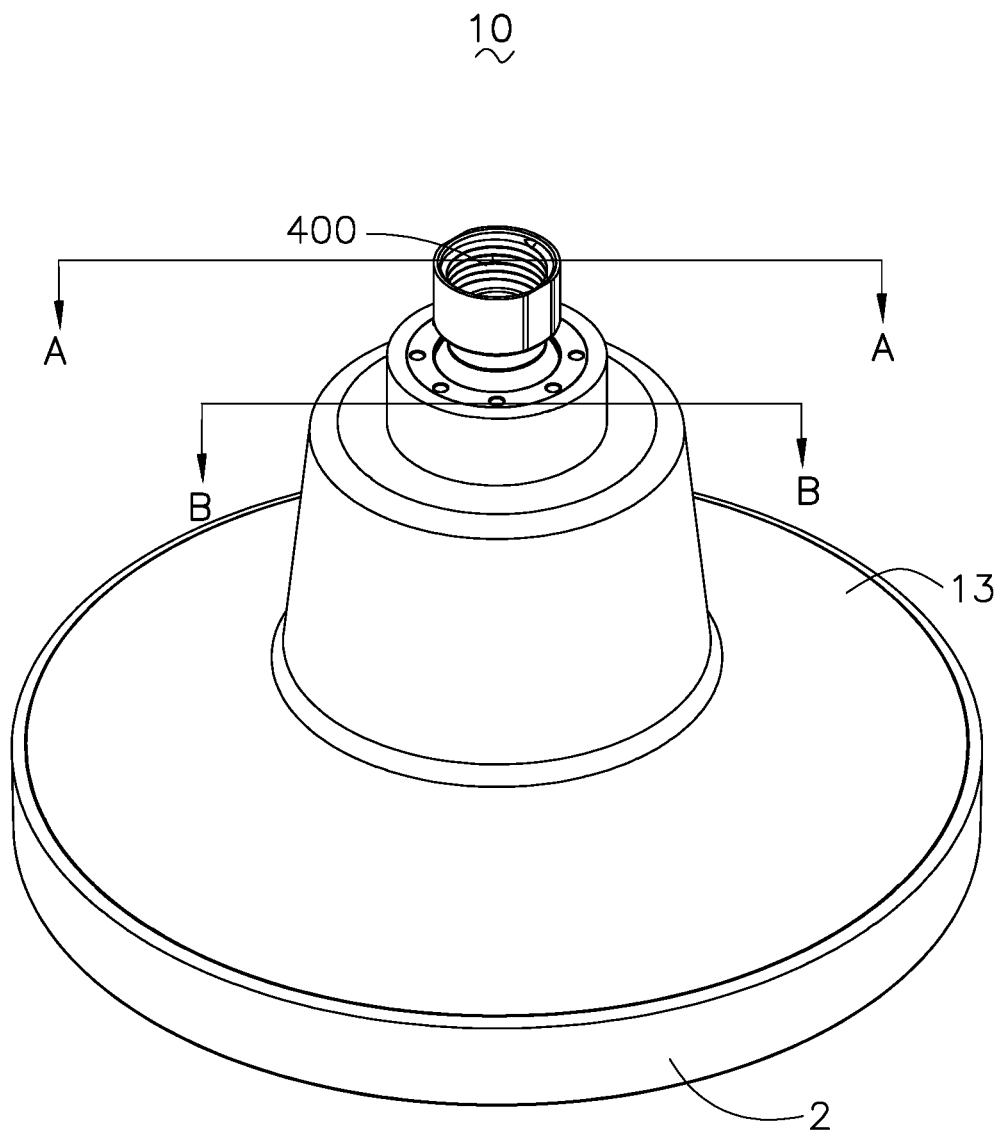
FIG. 1 is an illustrative isometric view of a spray head according to a first embodiment of the present invention.
Figure 2:
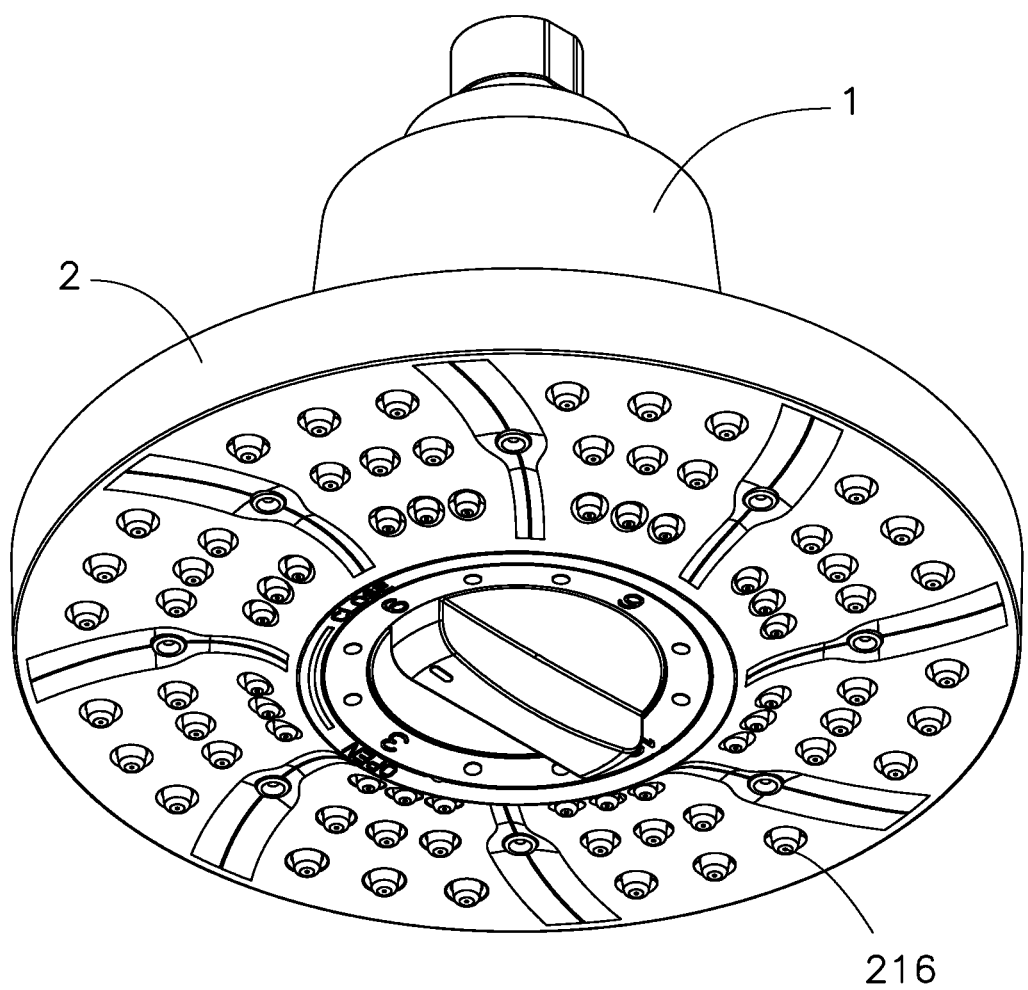
FIG. 2 is an illustrative isometric view of the spray head shown in FIG. 1, but from another aspect.
Figure 3:
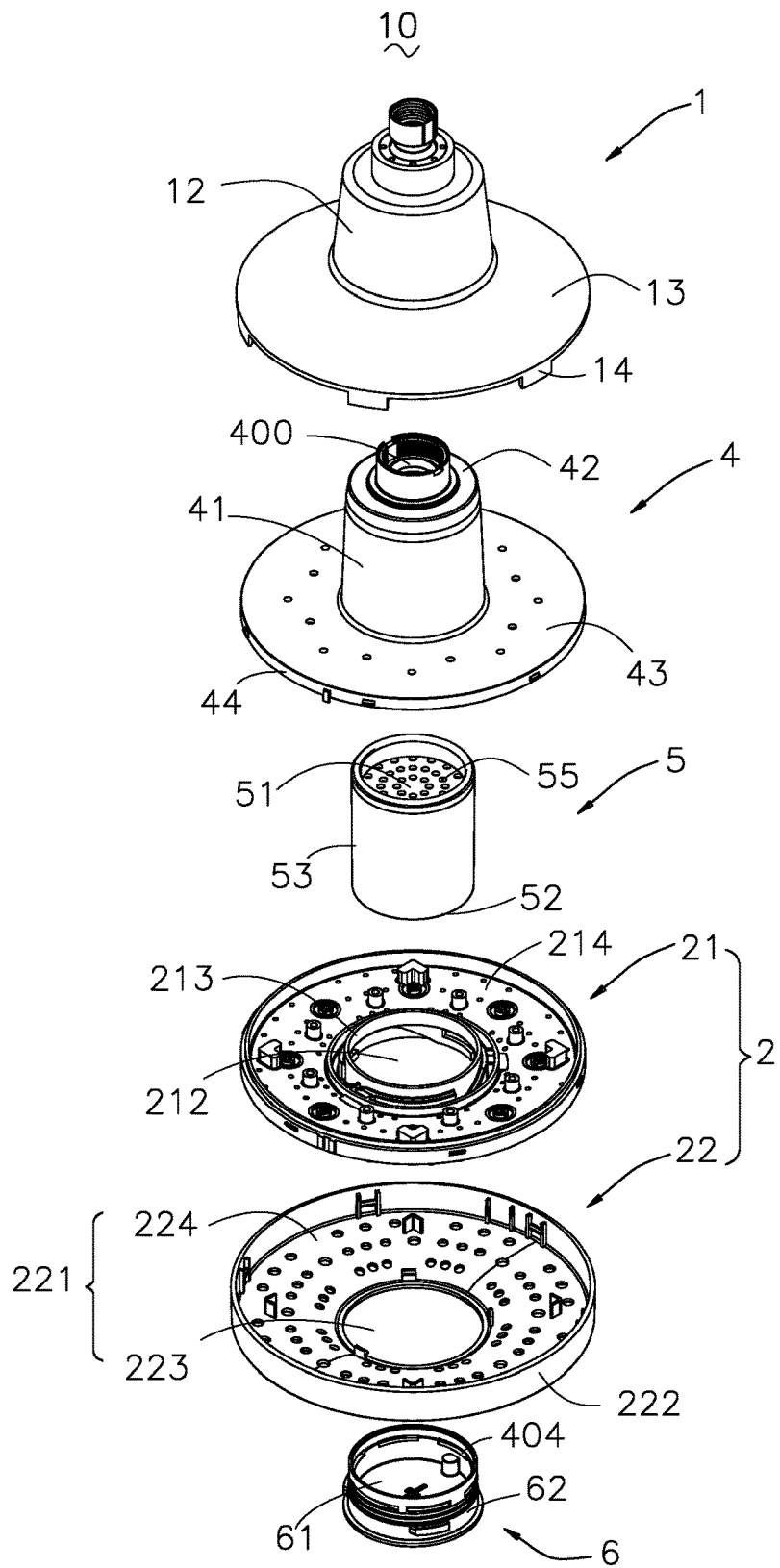
FIG. 3 is an exploded view of the spray head shown in FIG. 1.
Figure 4:
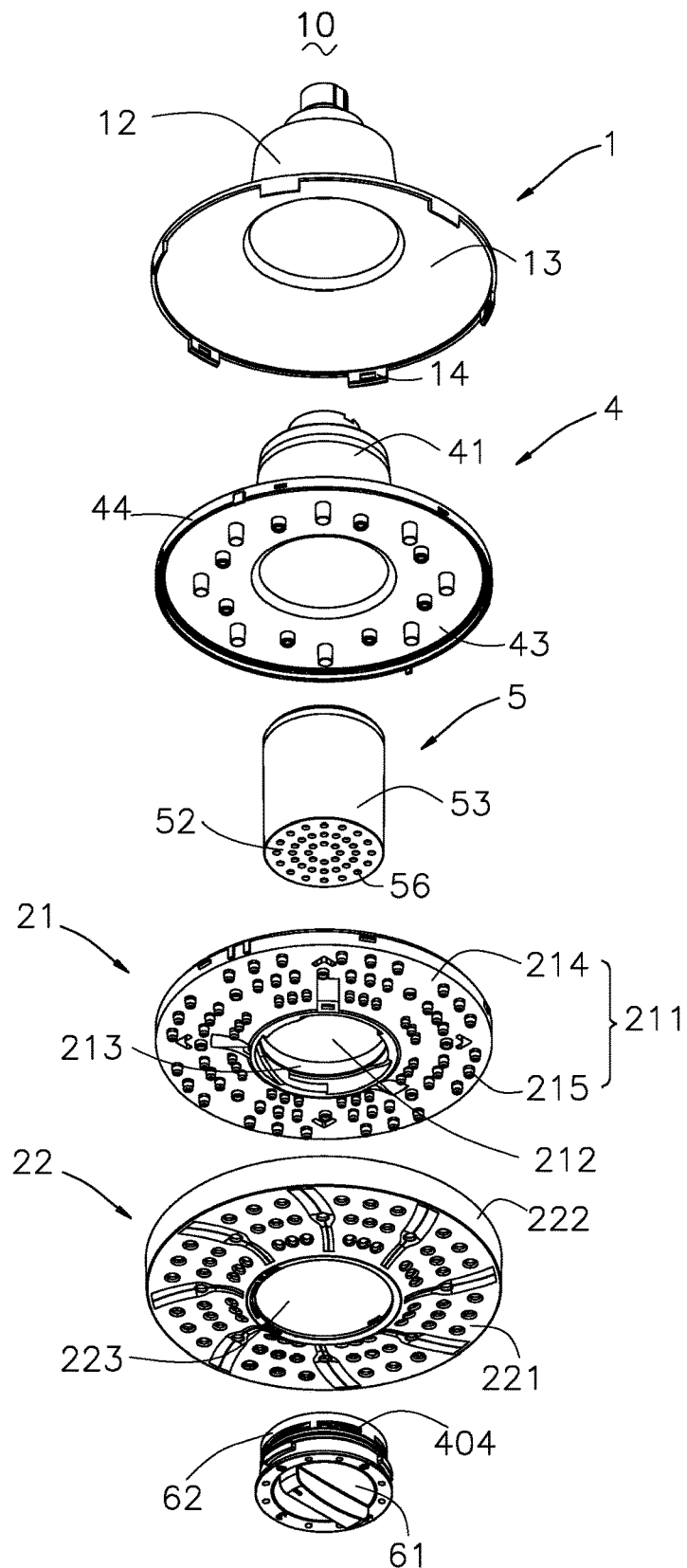
FIG. 4 is an exploded view of the spray head shown in FIG. 1, but from another aspect.
Figure 5:
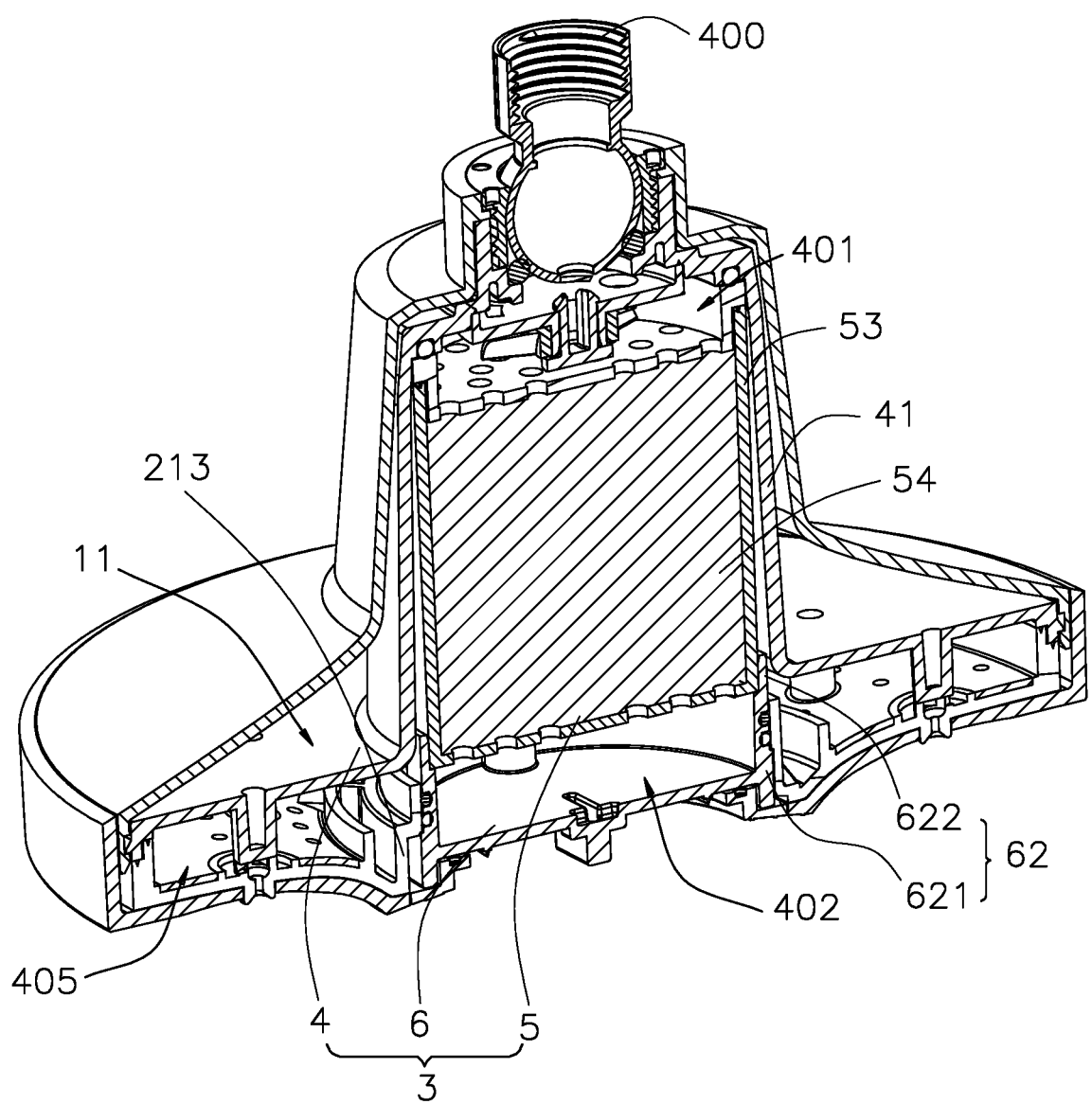
FIG. 5 is a cross-sectional view of the spray head taken along line A-A of FIG. 1.
Figure 6:
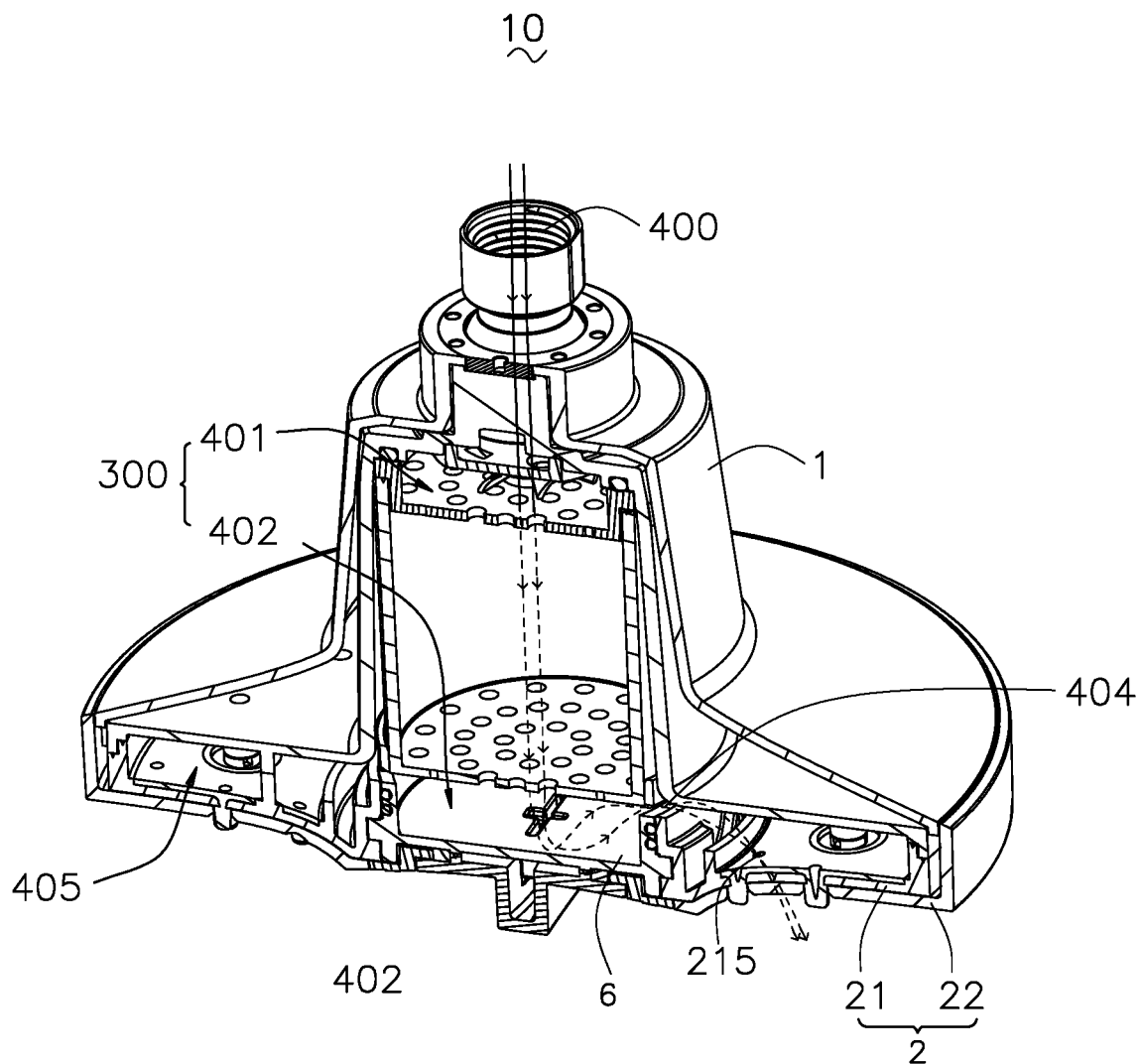
FIG. 6 is a cross-sectional view of the spray head taken along line B-B of FIG. 1, but from another aspect, a filter media thereof being partially removed away.
Figure 7:
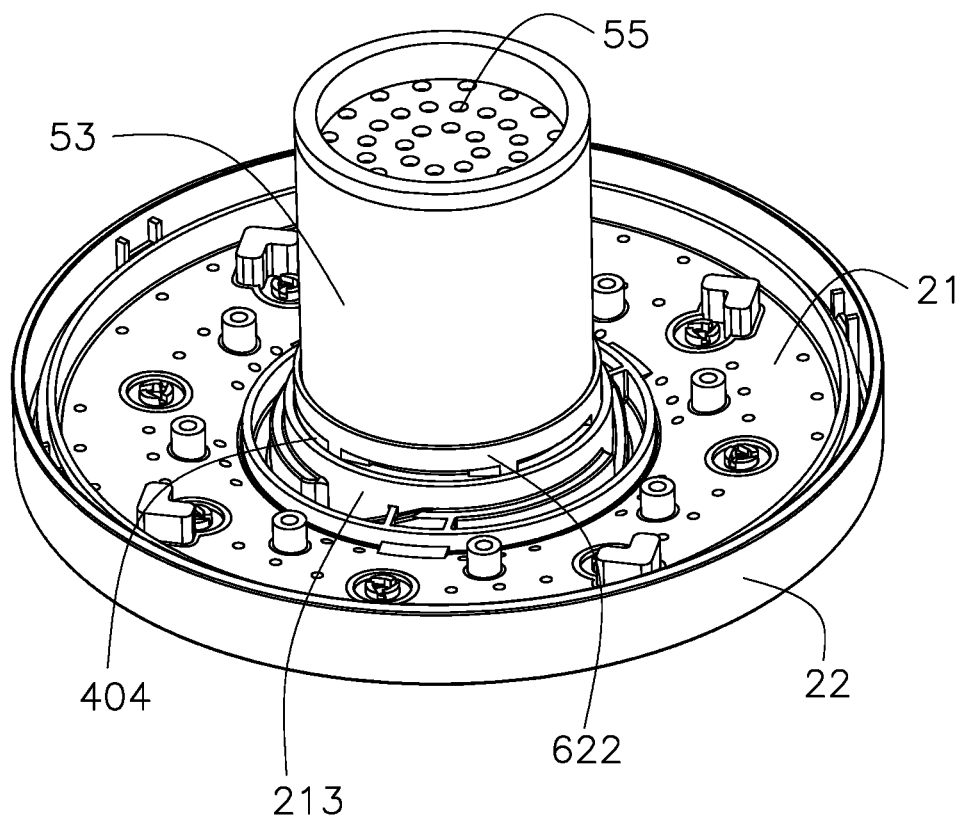
FIG. 7 is an isometric assembled of the spray head, a head portion and a case thereof being partially removed away.
Figure 8:
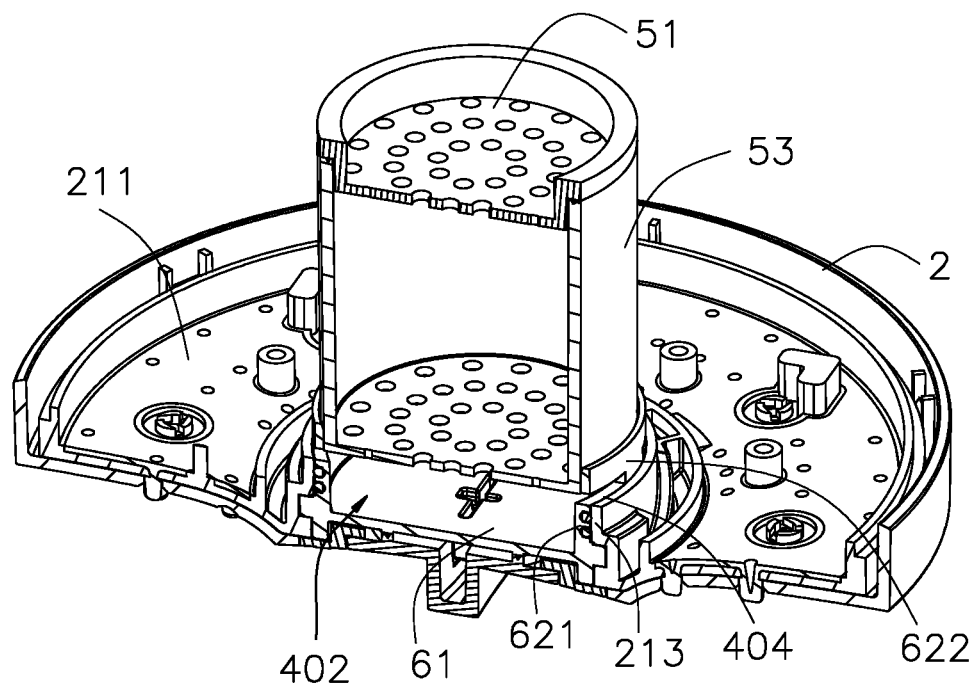
FIG. 8 is a cross-sectional view of the spray head shown in FIG. 6, a filter media thereof being partially removed away.
Figure 9:
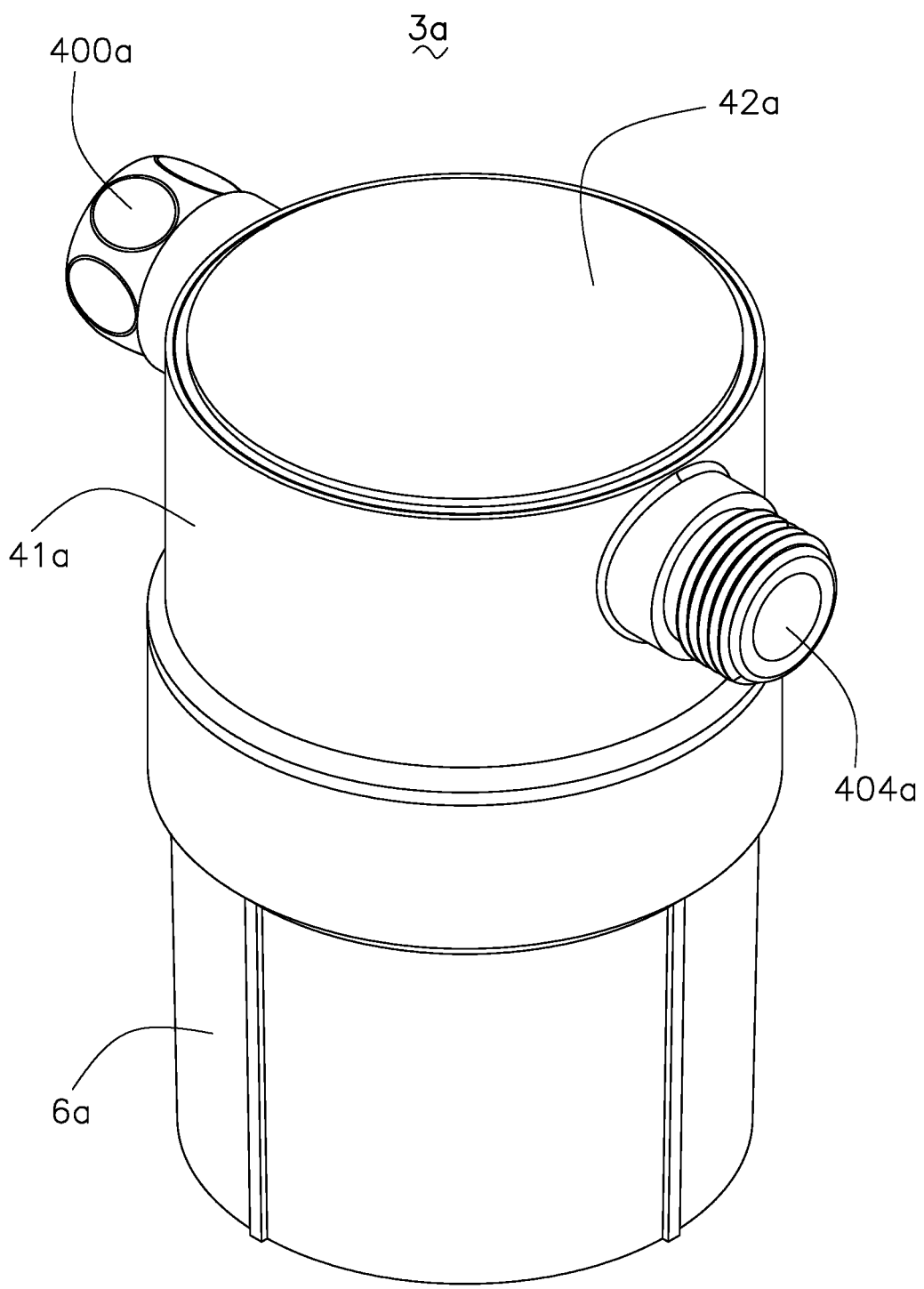
FIG. 9 an illustrative isometric view of a water filter device according to a second embodiment of the present invention.
Figure 10:
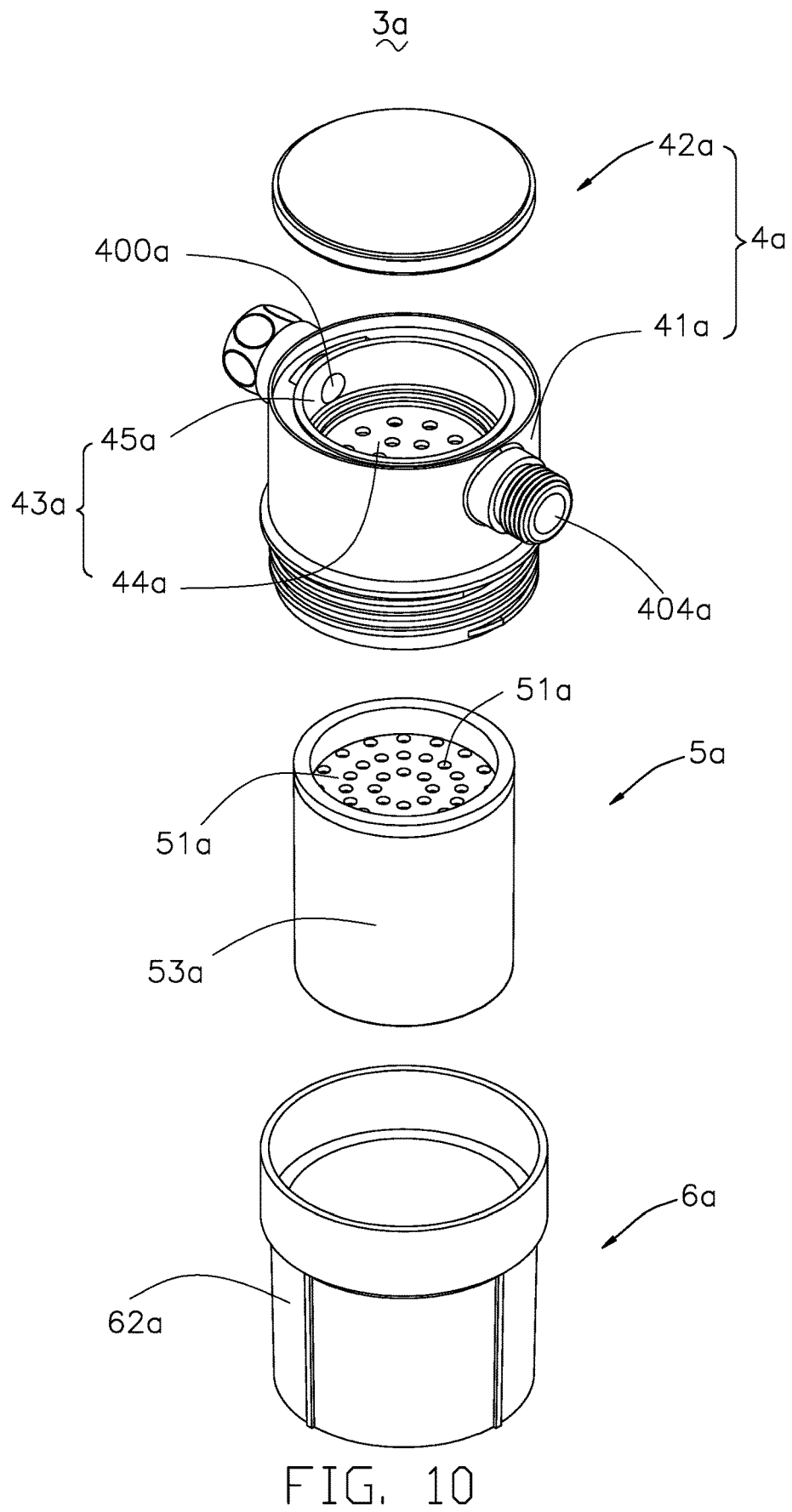
FIG. 10 is an exploded view of the water filter device shown in FIG. 9.
Figure 11:
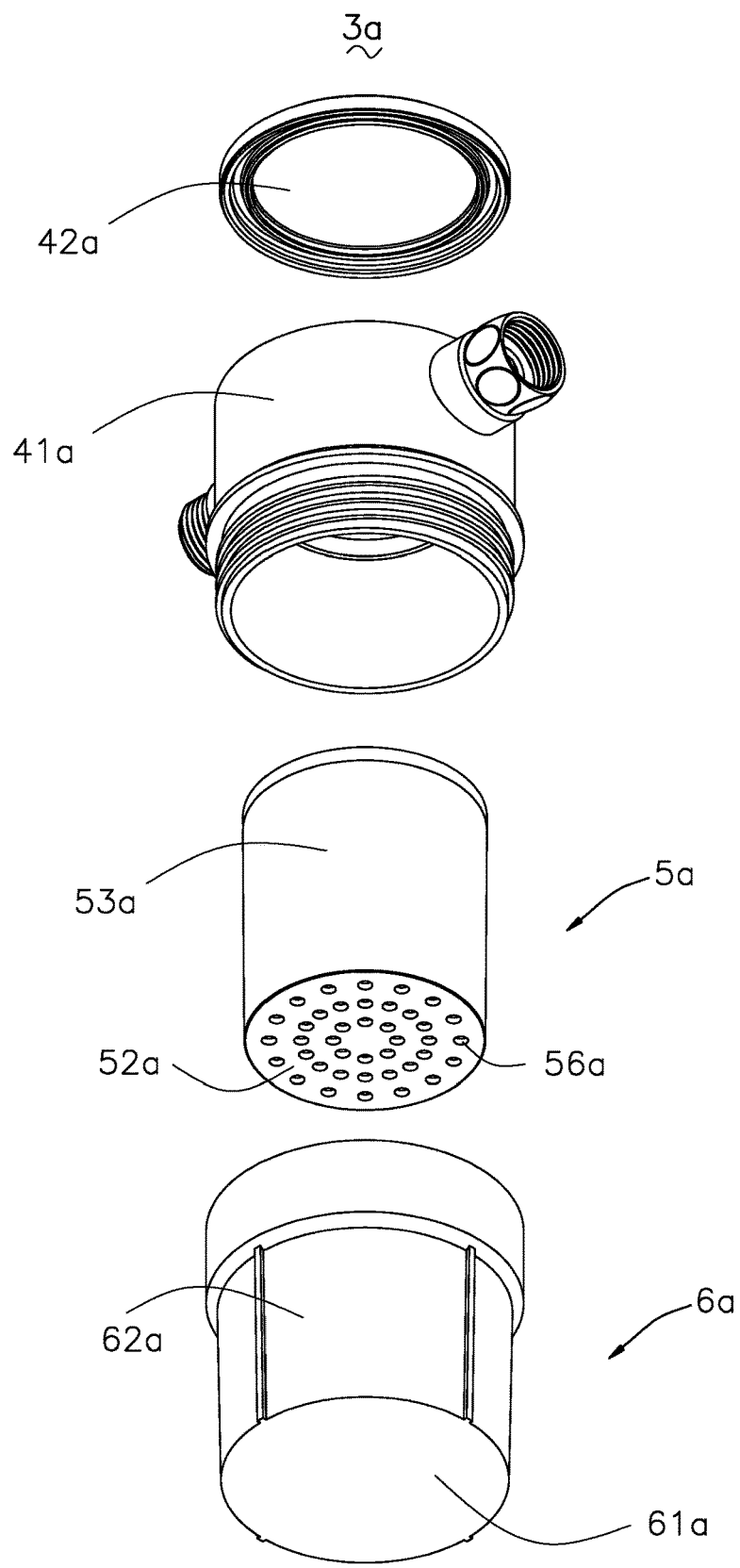
FIG. 11 is an exploded view of the water filter device shown in FIG. 9, but from another aspect.
Figure 12:
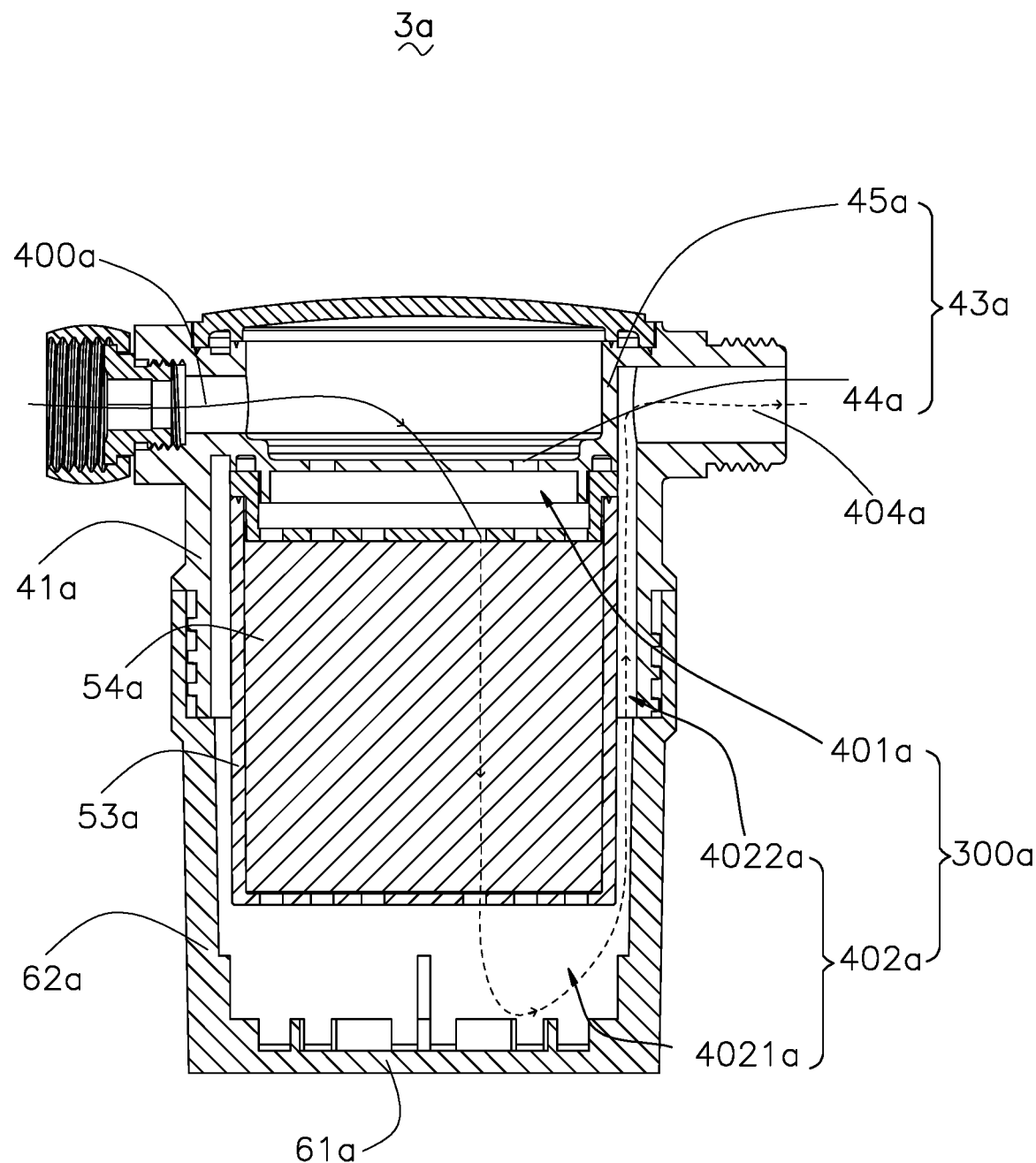
FIG. 12 is a cross-sectional view of the water filter device shown in FIG. 9.
Figure 13:
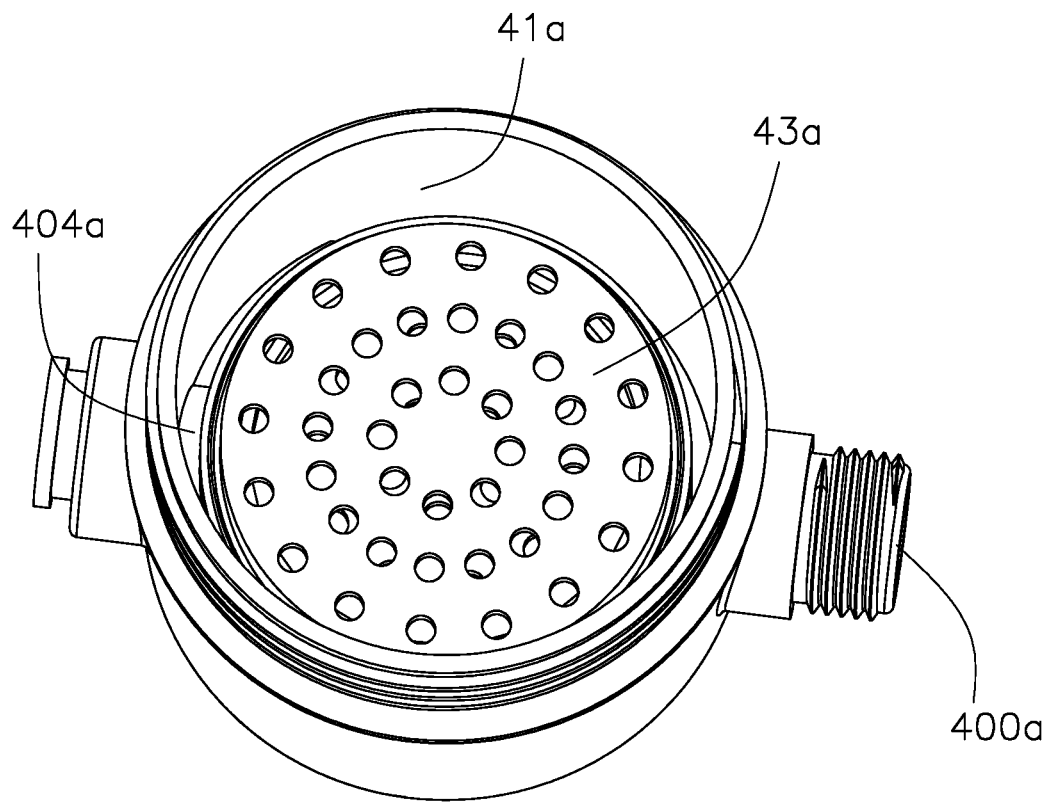
FIG. 13 is an illustrative isometric view of a case of the water filter device shown in FIG. 9.

The technical solutions of the present invention will be clearly and completely described below with reference to accompanying drawings and specific embodiments.

As shown in FIGS. 1-8, a water filter device 3 of a first embodiment of the present invention adapts to be secured in a spray head 10. The spray head 10 comprises a head portion 1, a spray portion 2 mounted on the head portion 1 for forming a receiving cavity 11 together with the head portion 1. The water filter device 3 received in the receiving cavity 11. The head portion 1 is configured to deliver unfiltered water, represented by solid-line arrows, to the water filter device 3 and comprises a U-shaped central portion 12, a supporting portion 13 protruded outwardly from the periphery of central portion 12, and at least one leg portion 14 extending downwardly from the periphery of the supporting portion 13 for engaging with the spray portion 2.

The spray portion 2 is attached to the head portion 11. The spray portion 2 is two-piece type and comprises an inner part 21 and an outer part 22 covered on the inner part 21 and the head portion 1. The inner part 21 comprises a baffle 211, a receiving opening 212 provided on the middle of the baffle 211, a fastening wall 213 projected from the baffle 211 and surrounding the receiving opening 212 for engaging with the water filter device 3. The baffle 211 is a circular plate 214 and comprises a plurality of protruding portions 215 protruding from the circular plate 214 towards the outer part 22 of the spray portion 2. Each of protruding portions 215 comprises at least one water outlet hole 216. The plurality of protruding portions 215 may be arranged in different groups. Filtered water, represented by dotted-line arrows, flows to the water outlet holes 216 of the corresponding protruding portions 215 through the circular plate 214 of the baffle 211 and is discharged to form a spray pattern. The outer part 22 comprises a spray plate 221 and a surrounding wall 222 extending upwardly from the periphery of the spray plate 221. The spray plate 221 comprises a middle opening 223 for receiving the water filter device 3 together with the receiving opening 212 and a plurality of apertures 224 surrounding the middle opening 223 in order. A part of each of the protruding portions 225 extends to the apertures 224 and is exposed out of the spray plate 221, respectively.

The water filter device 3 comprises a case 4 having an inlet port 400, a detachable portion 6 connected with the case 4 and easily disassembled and reassembled from the case 4 for forming an accommodation space 300 with the case 4, a filter cartridge 5 received in the accommodation space 300 for dividing the accommodation space into an inlet chamber 401 and a redirected passage 402 sealed off from the inlet chamber 401. The filter cartridge 5 and the detachable portion 6 are easily detachable and can be replaced, respectively.

The case 4 comprises a lateral 41, a first portion 42 mounted on the lateral 41 for receiving the filter cartridge 5 together with the lateral 41, a connecting portion 43 protruded outwardly from the periphery of the lateral 41 and positioned between the baffle 211 of the spray portion 2 and the supporting portion 13 of the head portion 1 and an engaging portion 44 extending from the periphery of the connecting portion 43 for engaging with the leg portion 14 of the head portion 1. The first portion 42 of the case 4 is a circular plate. The lateral 41 of the case 4 is annular configuration and is surrounded by the central portion 12 of the head portion 1. The lateral 41 of the case 4 and the central portion 12 of the head portion 1 are arranged so that the case 4 is shaped to match the head portion 1.

The detachable portion 6 includes a second portion 61 opposite to the first portion 42 of the case 4 and a side portion 62 extending from the second portion 61 for abutting against the lateral 41 of the case 4. The second portion 61 of the detachable portion 6 is a circular plate and the side portion 62 of the detachable portion 6 is annular configuration. In the present exemplary embodiment, the side portion 62 comprises a first fixing wall 621 inserted into the receiving opening 212 and abutting against the fastening wall 213 of the spray portion 2, a second fixing wall 622 extending from the first fixing wall 621 and connected to the lateral 41 of the case 4 and at least an outlet port 404 drilled completely through the second fixing wall 622. Optionally, an outlet port formed on the lateral of the case. The filtered water flows out from the outlet port of the lateral.

In the present exemplary embodiment, the inlet port 400 is provided on the first portion 42 and is in fluid connection with the inlet chamber 401. Optionally, an inlet port is formed on the lateral and spaced apart from the outlet port 404. While assembled, the case 4 is mounted on the inner part 21 of the spray portion 2 for forming a receiving chamber 405 fluidly coupling to the outlet port 404 and effectively delivering and guiding the filtered water to the protruding portions 215 via the outlet port 404.

Accordingly, the first fixing wall 621 of the detachable portion 6 and the fastening wall 213 of the spray portion 2 can be secured together by threads, snap-fit, friction fit, etc., to fix the detachable portion 6 on the spray portion 2. The lateral 41 of the case 4 and the second fixing wall 622 of the detachable portion 6 can be secured together by threads, snap-fit, friction fit, etc., to fluidly seal off the redirected passage 402.

The filter cartridge 5 comprises a top portion 51, a bottom 52 opposite to the top portion 51, a sidewall 53 connected with the top portion 51 and the bottom 52, and a cylindrical or tubular filter media 54 received therein. The top portion 51 comprises a plurality of inlet holes 55 and the bottom 52 comprises a plurality of guiding holes 56. When assembled, the second fixing wall 622 is sandwiched between the lateral 41 of the case 4 and the sidewall 53 of the filter cartridge 5. The redirected passage 402 is formed by the bottom 52 of the filter cartridge 5 together with the second portion 61 and the side portion 62 of the detachable portion 6. In the present exemplary embodiment, the outlet port 404 is located below the bottom 52 of the filter cartridge 5, so that the filtered water directly flows out from the outlet port 404 through the redirected passage 402.

In usage state, when the unfiltered water enters into the inlet chamber 401 via the inlet port 400 and passes through the inlet holes 55 of the top portion 51 of the filter cartridge 5 will surround the filter cartridge 5. The filtered water comes from the guiding holes 56 of the filter cartridge 5 via the bottom 52 thereof, flows down into the redirected passage 402 and is forced and redirected by the second portion 61 and the side portion 62 of the detachable portion 6, thereby delivering and guiding the filtered water to flow into the receiving chamber 405 via the outlet port 404, and then discharges out from the water outlet holes 216 of the protruding portions 215.

Compared with the related art, the outlet port provides on the side portion of the detachable portion, so the filtered water can be redirected by the redirected passage and discharged out from the water filter device along a side direction of the water filter device, thereby the detachable portion can be easily disassembled and reassembled from the case and the spray portion. When replacing the filter cartridge, there is no need to remove the entire spray head, just directly remove the detachable portion from the spray portion and the case.

FIGS. 9-13 show a water filter 3a device of a second embodiment of the present invention similar to that of the first embodiment of the present invention except that the water filter device 3a adapted to be secured between an outlet end of a shower arm or waterpipe and a spray head in a known manner. The water filter device 3a related to the present invention is preferably substantially cylindrical in shape and includes a case 4a having an inlet port 400a, a detachable portion 6a connected with the case 4a and easily disassembled and reassembled from the case 4a for forming an accommodation space 300a with the case 4a, a filter cartridge 5a received in the accommodation space 300a for dividing the accommodation space 300a into an inlet chamber 401a and a redirected passage 402a together with the case 4a and the detachable portion 6a. The inlet chamber 401a is sealed off from the redirected passage 402a. The inlet port 400a is capable of delivering unfiltered water, represented by solid-line arrows, to the inlet chamber 401a.

The case 4a comprises a lateral 41a, a first portion 42a mounted on the lateral 41a, and an outlet port 404a drilled from an outer surface of the lateral 41a completely through an inner surface of the lateral 41a. The first portion 42a of the case 4a is a circular plate and the lateral 41a of the case 4a is annular configuration. In the present exemplary embodiment, the inlet port 400a is formed on the lateral 41a and spaced apart from the outlet port 404a. The inlet port 400a is in fluid connection with the outlet end of a shower arm or waterpipe and the outlet port 404a is in fluid connection with the spray head. Optionally, an inlet port is formed on the first portion.

In the present exemplary embodiment, the case 4a further comprises a separating wall 43a received in the accommodation space 300a for fixing the filter cartridge 5a. The separating wall 43a comprises a fixing portion 44a opposite to the first portion 42a and at least partly spaced apart from the lateral 41a at a predetermined distance and an extending portion 45a extending from the fixing portion 44a and connecting to the lateral 41a of the case 4a. The lateral 41a and separating wall 43a are manufactured by injection molding, thereby forming an integral unit. Optionally, a lateral and a first portion is the type of one-piece.

The detachable portion 6a includes a second portion 61a opposite to the first portion 42a of the case 4a and a side portion 62a and extending from the second portion 61a for abutting against the lateral 41a of the case 4a. The second portion 61a of the detachable portion 6a is a circular plate and the side portion 62a of the detachable portion 6a is annular configuration.

Accordingly, the case 4a and the detachable portion 6a can be secured together by threads, snap-fit, friction fit, etc., to fix the detachable portion 6 on the case 4a. In the present exemplary embodiment, the case 4a and detachable portion 6a may be fabricated in any desired manner, using any acceptable material, such as by molding a plastic material to form the two portions in such a manner that they are sized and dimensioned so as to be capable of being scalingly screwed together and apart. The case 4a comprises an annular threaded lower portion and the detachable portion 6a comprises an internally threaded annular upper portion secured to the annular threaded lower portion, thereby fluidly sealing the redirected passage 402a.

The filter cartridge 5a is mounted on the separating wall 43a and captured within the accommodation space 300a. The filter cartridge 5a comprises a top portion 51a mounted on the fixing portion 44a of the case 4a, a bottom 52a opposite to the top portion 51a, a sidewall 53a connected with the top portion 51a and the bottom 52a and a cylindrical or tubular filter media 54a received therein. The top portion 51a comprises a plurality of inlet holes 55a and the bottom 52a comprises a plurality of guiding holes 56a. When assembled, the redirected passage 402a is formed by the bottom 52a of the filter cartridge 5a, the second portion 61a and the side portion 62a of the detachable portion 6a. Optionally, a redirected passage is formed by the bottom of the filter cartridge, a lateral together with a second portion and a side portion of a detachable portion.

In the present exemplary embodiment, the outlet port 404a provides above the top portion 51a of the filter cartridge 5a. Optionally, an outlet port faces the sidewall of the filter cartridge 5a. When assembled, the redirected passage 402a comprises a bottom passage 4021a located below the bottom 52a of the filter cartridge 5a and a side passage 4022a fluidly connected with the bottom passage 4021a. The bottom passage 4021a is formed by the bottom 52a of the filter cartridge 5a together with the second portion 61a and the side portion 62a of the detachable portion 6. The side passage 4022a is formed by the lateral 41a of the case 4a together with the sidewall 53a of the filter cartridge 5a.

In usage state, when the unfiltered water enters into the inlet chamber 401a via the inlet port 400a and passes through the inlet holes 55a of the top portion 51a of the filter cartridge 5a will surround the filter media 54a of the filter cartridge 5a. Filtered water, represented by dotted-line arrows, comes from the guiding holes 56a of the filter cartridge 5a, flows down into the bottom passage 4021a of the redirected passage 402a and is forced and redirected by second portion 61a and the side portion 62a of the detachable portion 6a, flows upwardly into the side passage 4022a of the redirected passage 402a, thereby delivering and guiding the filtered water to flow out from the outlet port 404a.

Compared with the related art, the outlet port provides on the lateral of the case, so the filtered water can be redirected by the redirected passage and discharged from a side direction of the water filter device, thereby the detachable portion can be easily disassembled and reassembled from the case. When replacing the filter cartridge, there is no need to remove the entire water filter device and the spray head connected with the water filter device, just directly remove the detachable portion from the case.

Figure 14:
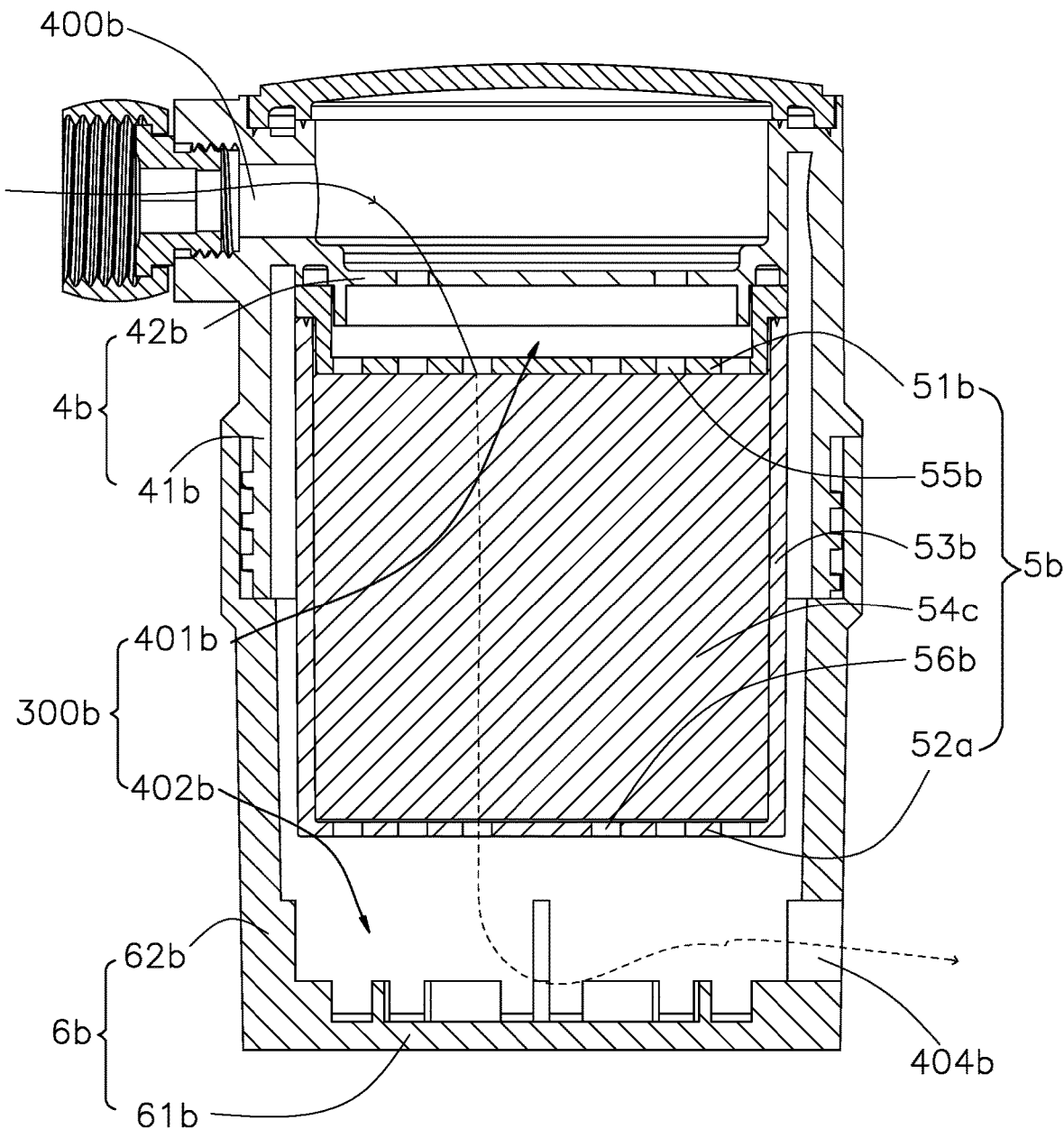
FIG. 14 is cross-sectional view of a water filter device according to a third embodiment of the present invention.

A third embodiment of the present invention is shown in FIG. 14. FIG. 14 shows a water filter device 3b similar to that of the second embodiment of the present invention except that a position of an outlet port 404b and a structure of a redirected passage 402b. A water filter device 3b related to the present invention is preferably substantially cylindrical in shape and includes a case 4b having an inlet port 400b, a detachable portion 6b connected with the case 4b and easily disassembled and reassembled from the case 4b for forming an accommodation space 300b with the case 4b, a filter cartridge 5b received in the accommodation space 300b for dividing the accommodation space 300b into an inlet chamber 401b and a redirected passage 402b sealed off from the inlet chamber 401b. The inlet port 400b is capable of the delivering unfiltered water, represented by solid-line arrows, to the inlet chamber 401b.

The case 4b comprises a lateral 41b, a first portion 42b mounted on the lateral 41b, and an outlet port 404b drilled from an outer surface of the lateral 41b completely through an inner surface of the lateral 41b. The first portion 42b of the case 4b is a circular plate and the lateral 41b of the case 4b is annular configuration. In the present exemplary embodiment, the inlet port 400b is formed on the lateral 41b and spaced apart from the outlet port 404b. Optionally, an inlet port is formed on the first portion. The inlet port 400b is in fluid connection with an outlet end of a shower arm or waterpipe and the outlet port 404b is in fluid connection with a spray head.

The detachable portion 6b includes a second portion 61b opposite to the first portion 42b of the case 4b and a side portion 62b and extending from the second portion 61b for abutting against the lateral 41b of the case 4b. The second portion 61b of the detachable portion 6b is a circular plate and the side portion 62b of the detachable portion 6b is annular configuration.

Accordingly, the case 4b and the detachable portion 6b can be secured together by threads, snap-fit, friction fit, etc., to fix the detachable portion 6b on the case 4b. In the present exemplary embodiment, the case 4b and detachable portion 6b may be fabricated in any desired manner, using any acceptable material, such as by molding a plastic material to form the two portions in such a manner that they are sized and dimensioned so as to be capable of being sealingly screwed together and apart. The case 4b comprises an annular threaded lower portion and the detachable portion 6b comprises an internally threaded annular upper portion secured to the annular threaded lower portion, thereby fluidly sealing off the redirected passage 402b.

The filter cartridge 5b comprises a top portion 51b, a bottom 52b opposite to the top portion 51b, a sidewall 53b connected with the top portion 51b and the bottom 52b and a cylindrical or tubular filter media 54b received therein. The top portion 51b comprises a plurality of inlet holes 55b and the bottom 52b comprises a plurality of guiding holes 56b. When assembled, the redirected passage 402b is formed by the bottom 52b of the filter cartridge 5b together with the second portion 61b and the side portion 62b of the detachable portion 6b. In the present exemplary embodiment, the outlet port 404b is located below the bottom 52b of the filter cartridge 5b. Filtered water, represented by dotted-line arrows, directly flows out from the outlet port 404b through the redirected passage 402b.

In usage state, when the unfiltered water enters into the inlet chamber 401b via the inlet port 400b and passes through the inlet holes 55b of the top portion 51b of the filter cartridge 5b will surround the filter cartridge 5b. The filtered water comes from the guiding holes 56b of the filter cartridge 5b, flows down into the redirected passage 402b and is forced and redirected by the second portion 61b and the side portion 62b of the detachable portion 6b, thereby delivering and guiding the filtered water to flow out from the outlet port 404b. The filtered water discharges from the filter cartridge 5b in a different direction than the unfiltered water flows in the filter cartridge 5b.

Compared with the related art, the outlet port provides on the side portion of the detachable portion, so the filtered water can be redirected by the redirected passage and discharged out from the water filter device along a side direction of the water filter device, thereby the detachable portion can be easily disassembled and reassembled from the case and the spray portion. When replacing the filter cartridge, there is no need to remove the entire water filter device and a spray head connected with the water filter device, just directly remove the detachable portion from the case.

Figure 15:
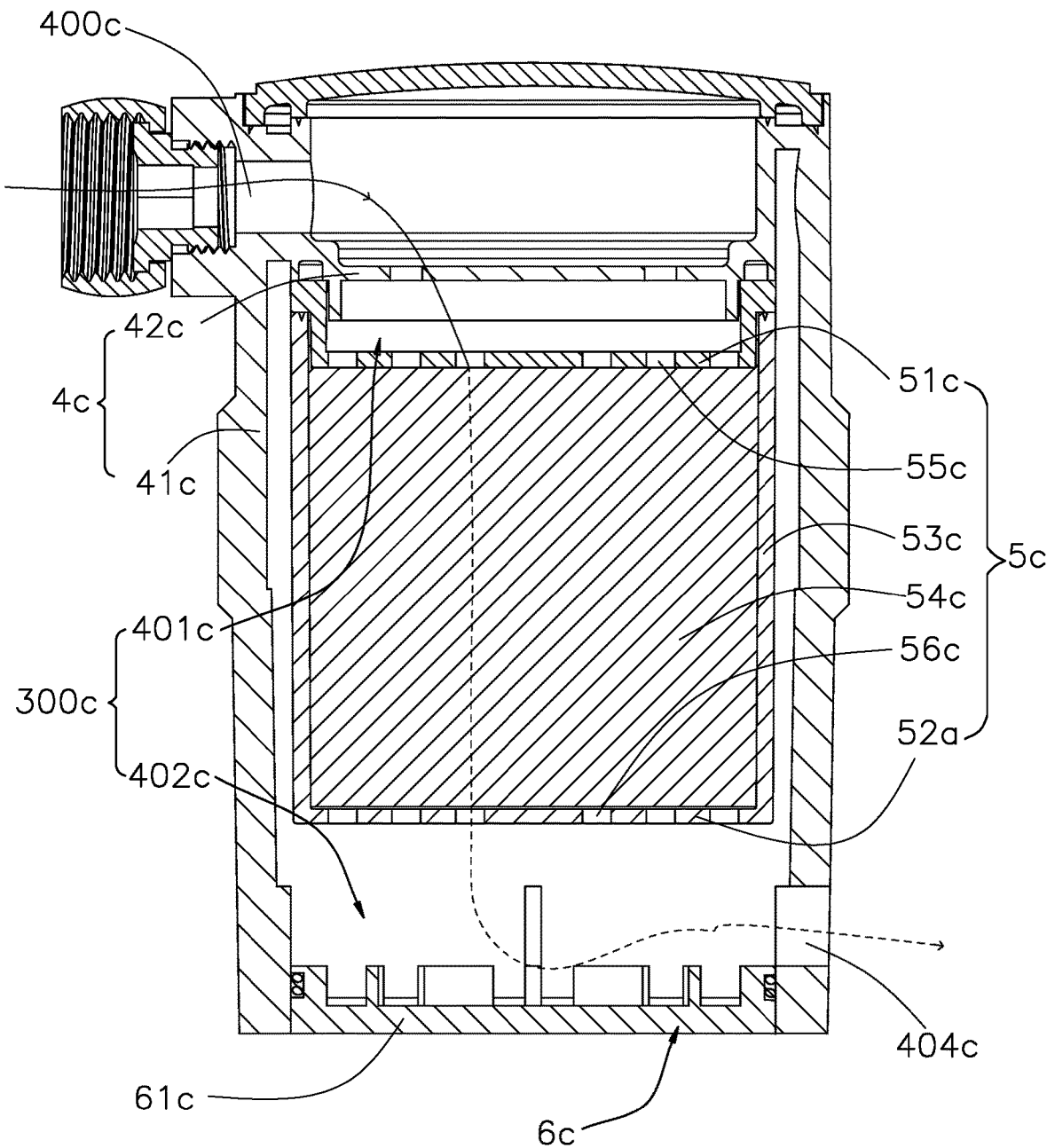
FIG. 15 cross-sectional view of a water filter device according to a fourth embodiment of the present invention.

A fourth embodiment of the present invention is shown in FIG. 15. FIG. 15 shows a water filter device 3c similar to that of the first, second or third embodiments of the present invention except that the side portion of the detachable portion can be omitted. The water filter device 3c related to the present invention is preferably substantially cylindrical in shape and includes a case 4c having an inlet port 400c, a detachable portion 6c connected with the case 3c and easily disassembled and reassembled from the case 4c for forming an accommodation space 300c with the case 4c, a filter cartridge 5c received in the accommodation space 300c for dividing the accommodation space 300c into an inlet chamber 401c and a redirected passage 402c together with the case 4c and the detachable portion 6c. The inlet chamber 401c is sealed off from the redirected passage 402c. The inlet port 400c is capable of delivering unfiltered water, represented by solid-line arrows, to the inlet chamber 401c.

The case 4c comprises a lateral 41c, a first portion 42c mounted on the lateral 41c, and an outlet port 404c drilled from an outer surface of the lateral 41c completely through an inner surface of the lateral 41c. The filter cartridge 5c comprises a top portion 51c, a bottom 52c opposite to the top portion 51c, a sidewall 53c connected with the top portion 51c and the bottom 52c, and a cylindrical or tubular filter media 54c received therein. The top portion 51c comprises a plurality of inlet holes 55c and the bottom 52c comprises a plurality of guiding holes 56c.

The detachable portion 6c comprises a second portion 61c directly abutting against the lateral 41c. In the present exemplary embodiment, the outlet port 404c provides below the bottom 52c of the filter cartridge 5c. When assembled, the redirected passage 402c is formed by the bottom 52c of the filter cartridge 5c, the lateral 41c of the case 4c and the second portion 61c of the detachable portion 6c. Optionally, the outlet port provides above the top portion of the filter cartridge. When assembled, a redirected passage comprises a bottom passage located below the bottom of the filter cartridge and a side passage fluidly connected with the bottom passage. The bottom passage is formed by the bottom of the filter cartridge together with the lateral of the case and the second portion of the detachable portion. The side passage is formed by the lateral of the case together with the sidewall of the filter cartridge. It is understood that in an alternative exemplary embodiment, an outlet port faces the sidewall of the filter cartridge.

Figure 16:
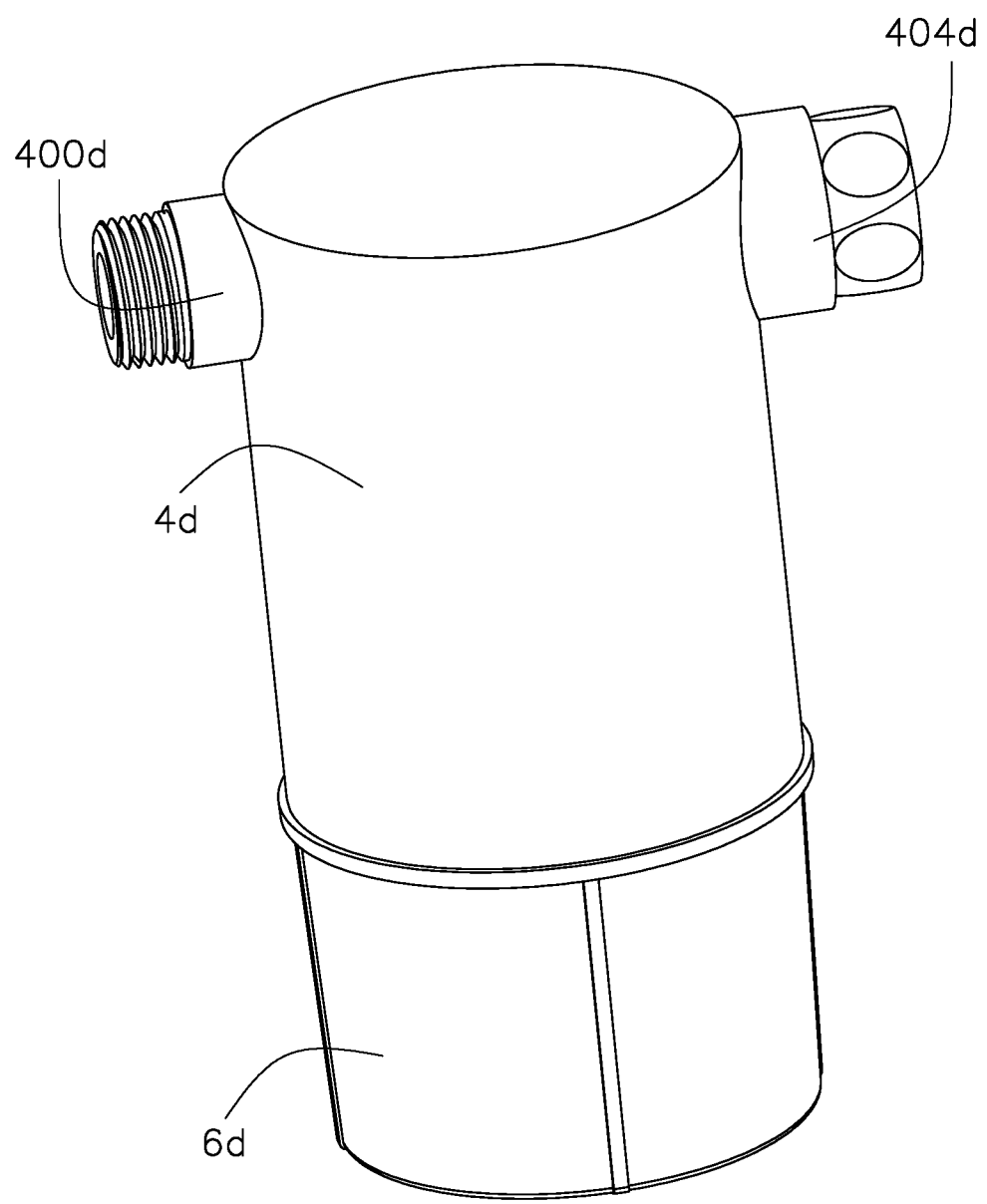
FIG. 16 an illustrative isometric view of a water filter device according to a fifth embodiment of the present invention.
Figure 17:
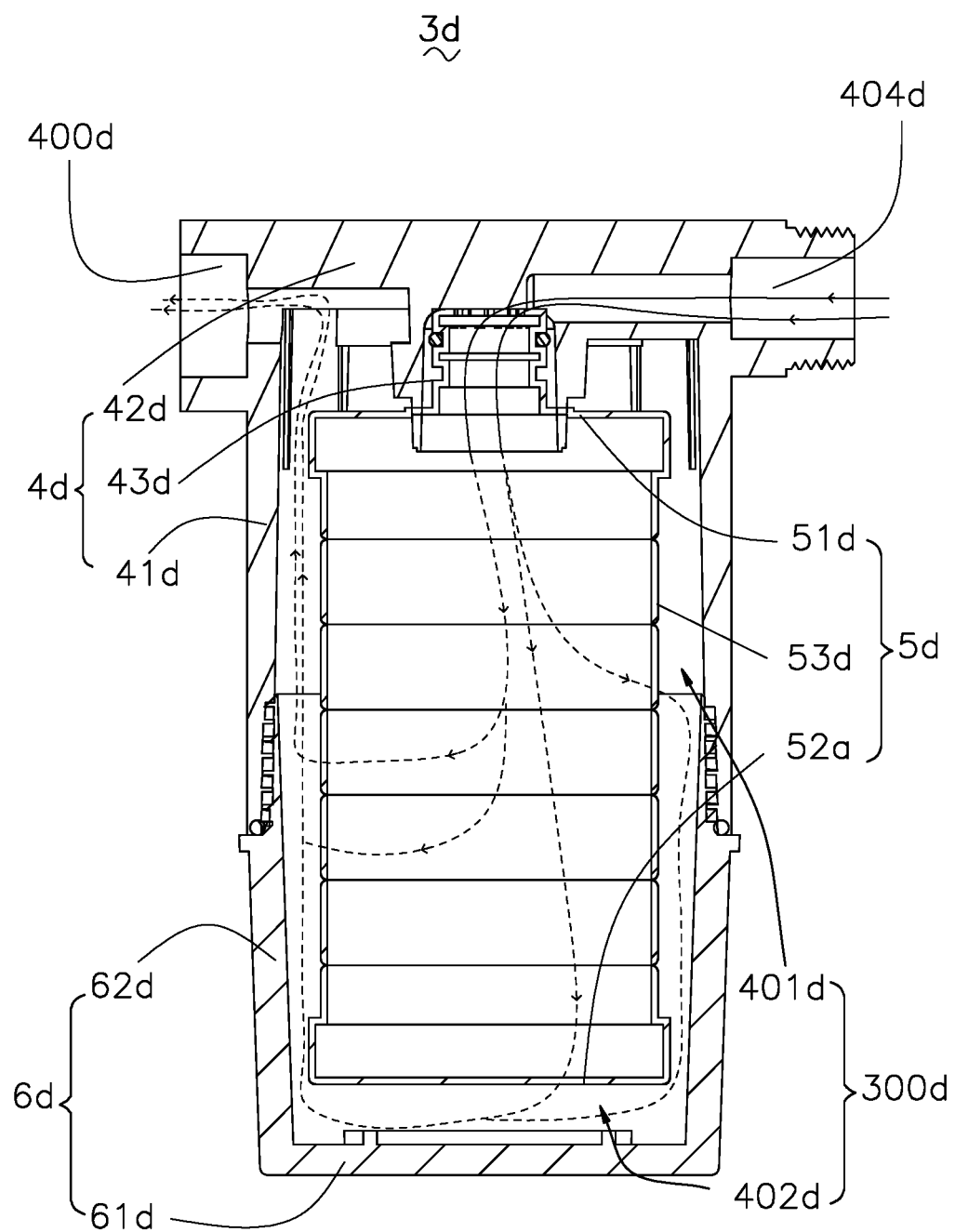
FIG. 17 is a cross-sectional view of the water filter device shown in FIG. 16.
Figure 18:
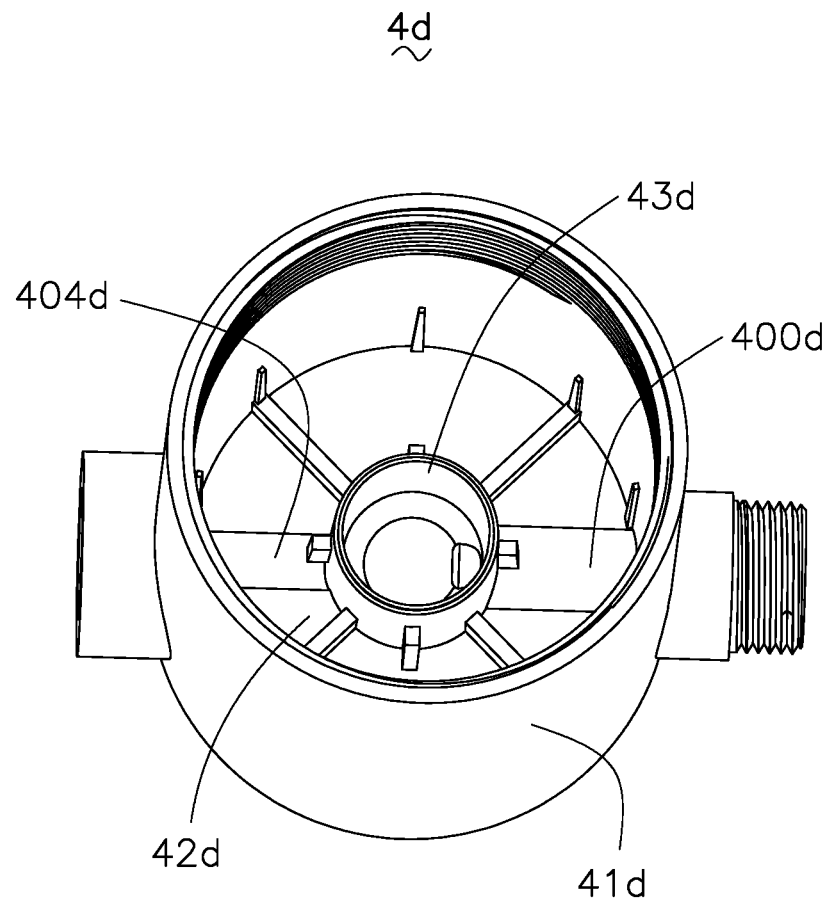
FIG. 18 is an illustrative isometric view of a case of the water filter device shown in FIG. 16.

A fifth embodiment of the present invention is shown in FIGS. 16-18. FIGS. 16-18 show a water filter device 3d similar to that of the first, second, third or fourth embodiments of the present invention except that a structure of a filter cartridge 5d. The water filter device 3d related to the present invention is preferably substantially cylindrical in shape and includes a case 4d having an inlet port 400d, and a detachable portion 6d connected with the case 4d and easily disassembled and reassembled from the case 4d for forming an accommodation space 300d with the case 4d. The filter cartridge 5d received in the accommodation space 300d for dividing the accommodation space 300d into an inlet chamber 401d and a redirected passage 402d together with the case 4d and the detachable portion 6. The inlet chamber 401d is sealed off from the redirected passage 402d. The inlet port 400d is capable of delivering unfiltered water, represented by solid-line arrows, to the inlet chamber 401d.

The case 4d comprises a lateral 41d, a first portion 42d mounted on the lateral 41d, and an outlet port 404d drilled from an outer surface of the lateral 41d completely through an inner surface of the lateral 41d, and a separating wall 43d received in the accommodation space 300a for fixing the filter cartridge 5d surrounding the inlet chamber 401d.

The filter cartridge 5d comprises a top portion 51d, a bottom 52d opposite to the top portion 51d, a sidewall 53d connected with the top portion 51d and the bottom 52d. The material of the filter media is a filter cotton. The filter cartridge 5d is composed of filter cotton elements stacked each other. Filtered water, represented by dotted-line arrows, flows out from the filter cartridge 5d through the sidewall 53d and the bottom 52d thereof and enters into the redirected passage 402d.

The detachable portion 6d includes a second portion 61d opposite to the first portion 42d of the case 4d and a side portion 62d and extending from the second portion 61d for abutting against the lateral 41d of the case 4d. The second portion 61d of the detachable portion 6d is a circular plate and the side portion 62d of the detachable portion 6d is annular configuration. Optionally, the side portion of the detachable portion can be omitted. A lateral directly abuts against a second portion of the detachable portion for forming a redirected passage.

The above are merely some embodiments of the present invention. It should be noted that for those of ordinary skill in the art, improvements can be made without departing from the inventive concept of the present invention, but these all fall into the protection scope of the present invention.

What is claimed is:

1. A water filter device for preparing filtered water and comprising:
    a case comprising an inlet port;
    a detachable portion disassembled and reassembled from the case for forming an accommodation space with the case;
    a filter cartridge received in the accommodation space for forming a redirected passage together with the detachable portion and the case, the filter cartridge comprising a top portion, a bottom opposite to the top portion, and a sidewall connected with the top portion and the bottom;
    wherein the case further comprises a lateral and an outlet port formed on the lateral, the outlet port is fluidly coupled to the redirected passage; and
    wherein when using, the filtered water flows out from the bottom of the filter cartridge, enters into the redirected passage and is redirected by the redirected passage, and then is discharged out from the outlet port;
    the redirected passage comprises: a bottom passage located below the bottom of the filter cartridge; and a side passage formed by the lateral of the case and the sidewall of the filter cartridge; a first direction in which water flows through the inlet port into the water filter device, a second direction in which the water flows through the outlet port to leave the water filter device, and a third direction in which the water flows in the bottom passage are substantially parallel to each other; a fourth direction in which the water flows in the side passage is substantially perpendicular to the first direction, the second direction, and the third direction.

2. The water filter device as described in claim 1, wherein the redirected passage is formed by the bottom of the filter cartridge and an inner surface of the detachable portion.

3. The water filter device as described in claim 1, wherein the outlet port faces the sidewall of the filter cartridge, and the side passage is fluidly coupled to the bottom passage.

4. The water filter device as described in claim 1, wherein the outlet port is located above the top portion of the filter cartridge and the side passage is fluidly connected with the bottom passage.

5. The water filter device as described in claim 4, wherein the case further comprises a separating wall received in the accommodation space for fixing the filter cartridge.

6. The water filter device as described in claim 1, wherein the detachable portion comprises a second portion opposite to the bottom of the filter cartridge and directly abutting against the lateral.

7. The water filter device as described in claim 1, wherein in usage state, the filtered water flows out from the filter cartridge through the sidewall and then enters into the redirected passage.

8. A water filter device for preparing filtered water and comprising:
- a case comprising an inlet port and a lateral;
- a detachable portion disassembled and reassembled from the case for forming an accommodation space with the case, the detachable portion comprising a second portion and a side portion extending from the second portion for abutting against the lateral of the case;
- a filter cartridge received in the accommodation space for forming a redirected passage together with the detachable portion, the filter cartridge comprising a top portion, a bottom opposite to the top portion, and a sidewall connected with the top portion and the bottom;
- wherein the detachable portion further comprises an outlet port formed on the side portion, the outlet port is fluidly coupled to the redirected passage; and
- wherein when using, the filtered water flows out from the bottom of the filter cartridge, enters into the redirected passage and is redirected by the redirected passage, and then is discharged out from the outlet port;
- the redirected passage comprises: a bottom passage located below the bottom of the filter cartridge; and a side passage formed by the lateral of the case and the sidewall of the filter cartridge; a first direction in which water flows through the inlet port into the water filter device, a second direction in which the water flows through the outlet port to leave the water filter device, and a third direction in which the water flows in the bottom passage are substantially parallel to each other; a fourth direction in which the water flows in the side passage is substantially perpendicular to the first direction, the second direction, and the third direction.

9. The water filter device as described in claim 8, wherein the redirected passage is formed by the bottom of the filter cartridge together with the second portion and the side portion of the detachable portion.

10. The water filter device as described in claim 8, wherein the outlet port faces the sidewall of the filter cartridge, the side passage formed by the side portion of the detachable portion together with the sidewall of the filter cartridge, and the side passage is fluidly coupled to the bottom passage.

11. The water filter device as described in claim 8, wherein the outlet port is located above the top portion of the filter cartridge, the side passage formed by the side portion of the detachable portion together with the sidewall of the filter cartridge, and the side passage is fluidly coupled to the bottom passage.

12. The water filter device as described in claim 11, wherein the case further comprises a separating wall received in the accommodation space for fixing the filter cartridge.

13. The water filter device as described in claim 8, wherein in usage state, the filtered water flows out from the filter cartridge through the sidewall and then enters into the redirected passage.

* * * * *